W. H. LUCE.
Shovel-Plow.
No. 58,112.
Patented Sept. 18, 1866.
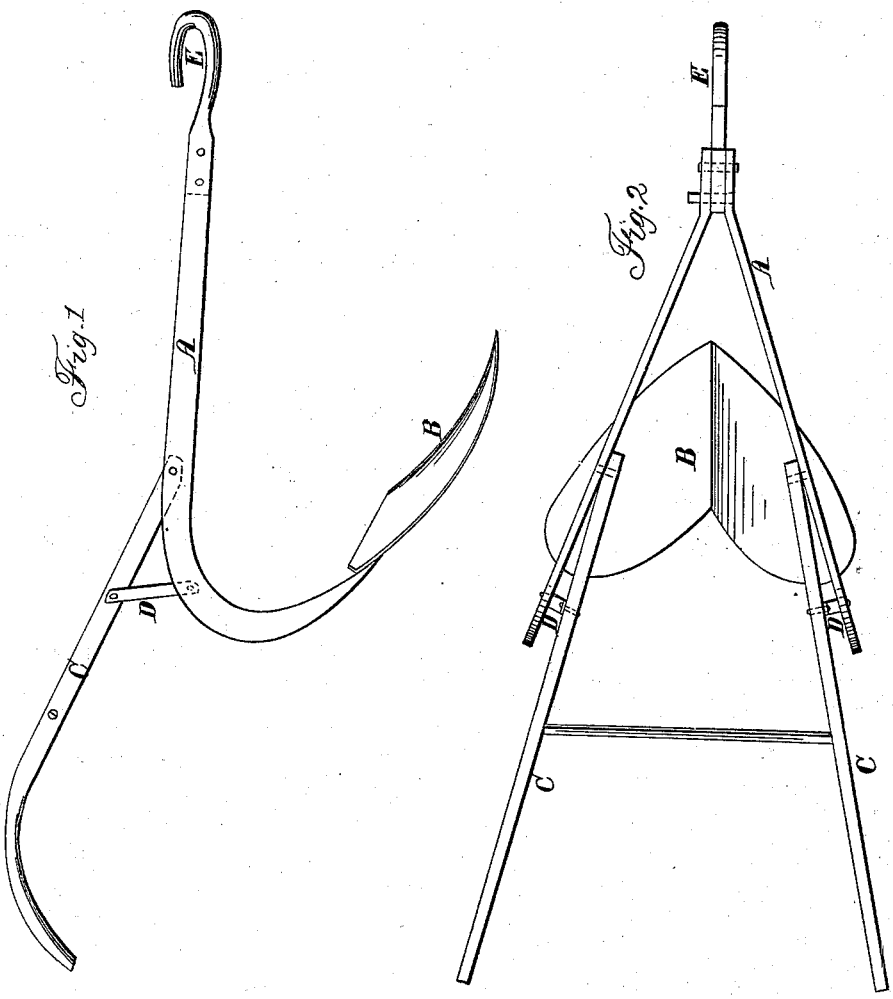

UNITED STATES PATENT OFFICE.

WILLIAM H. LUCE, OF HAMPTON, ILLINOIS.

IMPROVEMENT IN SHOVEL-PLOWS.

Specification forming part of Letters Patent No. 58,112, dated September 18, 1866.

*To all whom it may concern:*

Be it known that I, WILLIAM H. LUCE, of Hampton, in the county of Rock Island and State of Illinois, have invented a new and Improved Shovel-Plow; and I do hereby declare that the following is a full, clear, and exact description thereof, reference being had to the accompanying drawings, forming part of this specification.

The nature of my invention consists in providing a shovel-plow for the purpose of eradicating weeds and loosening up and pulverizing the ground from among corn, potatoes, and other crops that are sowed or planted in drills and rows.

To enable others skilled in the art to make and use my invention, I will proceed to describe its construction and operation.

Figure 2 is a top-plan view of my improved corn-plow. Fig. 1 is a side elevation of the same.

Letters of like name and kind refer to like parts in each of the figures.

A represents the beam of my improved shovel-plow, which forks at or near the draft-hook, and each portion diverges from each other as they extend back, when they are bent around and under, so as to receive the share B, which is made nearly in the form of a heart, and secured to the handles by any suitable means.

C C are the handles, of common form and construction, and secured to the beams A by any well-known means.

D D are posts or supports for the handles, and secured to the beams by screw-bolts or other means.

E is the hook or device to which the whiffle-tree is attached when in operation.

The share of my improved plow is made of thin steel plate, and each side from the center is made a little concave, so that it assumes something of the form of the single mold-board plow upon either side. This is light and durable, so that it can be handled and operated by a boy, and no implement is better adapted to eradicate and destroy weeds, and at the same time to loosen up and pulverize the ground among corn or potatoes or other crops that are sowed or planted in rows.

Having thus described my invention, what I claim, and desire to secure by Letters Patent of the United States, is—

The general construction and form of the beams A and handles C C, in combination with a double concave mold-board, B, substantially as described.

WILLIAM H. LUCE.

Witnesses:
FRANCIS BLOCK,
L. F. BAKER.